United States Patent
Lee et al.

(10) Patent No.: US 9,489,354 B1
(45) Date of Patent: Nov. 8, 2016

(54) MASKING CONTENT WHILE PRESERVING LAYOUT OF A WEBPAGE

(75) Inventors: Kevin J. Lee, Shoreline, WA (US); Michael W. Nail, Seattle, WA (US); Homan Lee, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 717 days.

(21) Appl. No.: 13/535,164

(22) Filed: Jun. 27, 2012

(51) Int. Cl.
*G06F 17/22* (2006.01)
*G06F 17/24* (2006.01)
*H04L 9/32* (2006.01)
*G06F 17/21* (2006.01)

(52) U.S. Cl.
CPC ........... *G06F 17/2247* (2013.01); *G06F 17/24* (2013.01); *G06F 17/211* (2013.01); *G06F 17/212* (2013.01); *G06F 17/218* (2013.01)

(58) Field of Classification Search
CPC .. G06F 17/2247; G06F 17/24; G06F 17/218; G06F 17/211; G06F 17/212
USPC ................................ 715/237, 253, 277, 234
See application file for complete search history.

(56) References Cited

U.S. PATENT DOCUMENTS

| | | | |
|---|---|---|---|
| 6,886,013 B1* | 4/2005 | Beranek ..................... | 715/234 |
| 7,954,052 B2* | 5/2011 | Curtis et al. ................. | 715/234 |
| 8,176,563 B2* | 5/2012 | Redlich ............... | G06F 21/6209 713/166 |
| 8,347,398 B1* | 1/2013 | Weber ..................... | G06F 21/85 713/189 |
| 2007/0245027 A1* | 10/2007 | Ghosh et al. ................. | 709/228 |
| 2008/0304112 A1* | 12/2008 | Matsuno ....................... | 358/403 |
| 2010/0017885 A1* | 1/2010 | Cohen ............... | G06Q 30/0276 726/26 |
| 2011/0145930 A1* | 6/2011 | Gnech et al. .................... | 726/28 |
| 2012/0079221 A1* | 3/2012 | Sivasubramanian et al. | 711/162 |
| 2012/0179787 A1* | 7/2012 | Walsh et al. .................. | 709/219 |
| 2012/0226975 A1* | 9/2012 | Grant et al. .................... | 715/273 |
| 2013/0262078 A1* | 10/2013 | Gleadall et al. ................. | 704/3 |

* cited by examiner

*Primary Examiner* — Scott Baderman
*Assistant Examiner* — Hassan Mrabi
(74) *Attorney, Agent, or Firm* — Lowenstein Sandler LLP (57) ABSTRACT

A method and apparatus for masking and unmasking content. A system configured to practice the example method embodiment parses a markup language document to identify a location of a section of the markup language document to mask and selects, based on a content type for content within the section, replacement content for the section. Then the system saves a copy of the section in a storage external to the markup language document. The system inserts the replacement content in the markup language document at the location in place of the section to mask the section while preserving formatting and layout of the markup language document. Upon receiving an indication to restore the section, the system inserts the copy of the section in the markup language document at the location in place of the replacement content.

20 Claims, 6 Drawing Sheets

MASKING CONTENT WHILE PRESERVING LAYOUT OF A WEBPAGE

BACKGROUND

Many companies maintain a presence on the World Wide Web, and some companies operate exclusively on the Internet. However, this can present a problem when a company is developing a secret project with a front end website component. One such example is when a company is developing a new product to be released. Web developers can develop and test web assets describing, promoting, and offering for sale the new product in secrecy so that the new web assets are ready to launch simultaneously with the new product. Simultaneous release of a product and well-tested web assets promoting the new product can offer a robust and unified presentation of the new product. However, companies desiring to maintain a high level of secrecy throughout development in order to prevent product leaks where confidential information is released early or is released via an unauthorized channel encounter difficulties in thoroughly testing confidential web assets prior to release of a product. For example, differences between the production and non-production environments can cause glitches which are only detected upon the web assets or other content going "live" on production servers. Such glitches can cause problems for users and can leave an unfavorable impression of the company.

If the web assets are made readily available, the company has little control over leaked information, which can reflect poorly on the company, the product, or the product launch.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein are methods, systems, and non-transitory computer-readable storage media for masking and unmasking content. One embodiment of the exemplary system allows individuals who are part of a managed group to view protected information, while individuals outside of this group are presented with meaningless information or no information. Individuals in charge of the protected project can manage, monitor, and enforce groups and group membership for protected project. Unauthorized users will have no way, other than making code changes to bypass the check, which are out of the control of the protected project, to view the protected content.

A system configured to practice the example method embodiment parses a markup language document to identify a location of a section of the markup language document to mask and selects, based on a content type for content within the section, replacement content for the section. Then the system saves a copy of the section in a storage that is external to the markup language document. The system inserts the replacement content in the markup language document at the location in place of the section to mask the section while preserving formatting and layout of the markup language document. Upon receiving an indication to restore the section, the system inserts the copy of the section in the markup language document at the location in place of the replacement content. The system can limit viewership of components on an existing page, while retaining formatting and layout of the page for testing, design, web development, or other purposes. The system can be used to develop "secret" projects by leveraging existing infrastructure to scale and reuse in addition to optional group level control over sensitive data. Using this system, users can test finalized web pages in a protected manner. For example, authorized testing or quality assurance personnel can find issues with spacing and wording that appears in the final version without having to wait for the final "secret" content to be uploaded or without working on fake information.

The system can restrict any text, image, or other page element that is requested as part of a request for a web based on the requester's access control groups or other credentials. The restriction can prevent non-authorized users from viewing the protected text or images or other page elements. This approach differs from arrangements such as displaying Amazon Prime shipping options to Amazon Prime customers. While Amazon Prime membership produces display differentiation, these options are customer discoverable and available to any eligible persons. Since customers can figure out a way to see Amazon Prime shipping options without a manual permission grant, the Amazon Prime approach uses a different mechanism entirely because it doesn't protect membership content. This approach also differs from a "members only" web site. Some experimental web sites or newly launched products will provide a beta test stage in which users can request access, and are allowed to test the site's functionality. That approach restricts entire folders and entire directories of functionality, and not data access.

Thus, the systems and methods set forth herein provide several advantages. First, the system can hide unreleased detail pages from internal users, such as employees who have access to an internal corporate network but who are not actively involved in development of the unreleased pages, who would otherwise have access to the unreleased pages. Second, the system hides certain pages in a way that does not severely impact quality assurance operations, development operations, ability to demo the pages, or web page launches.

Figure 1:
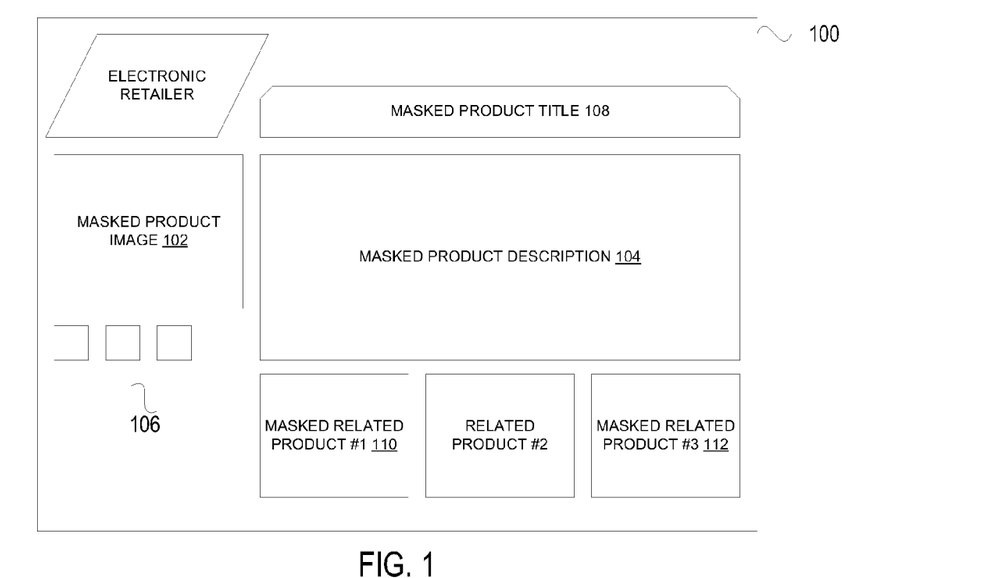
FIG. 1 illustrates components of an example markup language document.
Figure 2:
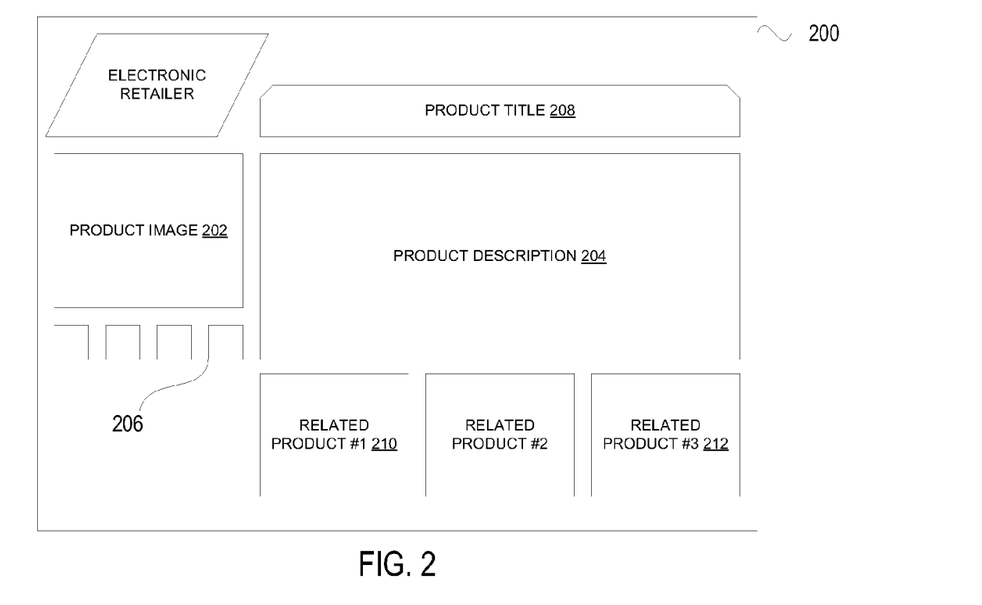
FIG. 2 illustrates a sample rendering of an example unmasked markup language document.

FIG. 1 illustrates a sample rendering 100 of an example masked markup language document, and FIG. 2 illustrates a sample rendering 200 of an example unmasked markup language document in which the masked document elements are replaced with the corresponding unmasked document elements. In this example, the image component 202 is replaced with a generic masked image 102, which can be of the same dimensions as the original image component 202. The system can alternatively replace the image component 202 with a generated image, a previous non-secret version of the original image component 202, a solid color, a blurred or otherwise obscured version of the original image component 202, or other image. The text text component 204 is replaced with masked text 104. In this example, the masked text 104 is Lorem Ipsum text, but other text can be used such as randomly generated text or text selected from another source. In one embodiment, the system analyzes the text on a word-by-word basis and replaces each word in the text component 204 with a nonsense word that matches the original spacing and length of that word. In this approach, while the words in the masked text 104 are completely different, the spacing and line breaks should be an exact match or a very close match. For example, in a fixed width font, the system can simply select replacement words that have a same number of characters because the characters have a fixed width. In a non fixed width font, the system can analyze a word length and select a replacement word that has the same length regardless of the number of characters. For example, the word "womb" in a particular font can be replaced with "illness" if the lengths are the same or sufficiently close. In some embodiments, the system can select words that are within a threshold length difference or within a tolerance. Thus, while the exact spacing and layout of the texts may not match, the masked text 104 can provide a sufficiently close approximation of the spacing and layout of the text component 204. If the unmasked text is edited so that the length or spacing of the words change, the system can automatically select updated masked text corresponding to the updated length or spacing.

The system can mask a single component in the markup language document leaving the remaining components unmasked, multiple components in the markup language document leaving other components unmasked, or all components in the markup language document so that no components are unmasked. Components can be linked so that a change in one prompts or leads to a change in another linked component. For example, a change in the product description 204 to the masked product description 104, can lead to a change in a linked component for the product title 208 to the masked product title 108. As another example, related products 210, 212 can be linked to the product description so that the system replaces them with masked related products 110, 112.

In one embodiment, the system parses XML or HTML markup language documents in order to insert masked content in the right places without disturbing the styling, layout, or structure of the markup language document. With respect to masking images, the system can parse the HTML to locate images such as by detecting an <IMG> tag. However images may not even be in a tag, especially for dynamic widgets. Then, the system can generate a placeholder image of a specified dimension. By using cascading style sheets (CSS) and image server arguments, the system can generate suitable masked images.

The system can optionally introduce additional elements into the markup language document to obscure or hide a subset of functionality. For example, the system can modify the set of graphical widgets 206, such as widgets to share a link to the product described in the web page 100 via various online services, to hide a graphical widget 206. The system can optionally introduce additional graphical widgets, which may or may not be functional.

In order to unmask the markup language document, the system replaces the masked components with the original components. A user can perform another quality assurance pass to ensure that the final content is correct. In some embodiments of this approach, the final text is not saved outside the design server until the final stage, the final images are not saved on the image server until the final stage, and testers can perform functional testing on masked pages.

In another embodiment, instead of parsing XML, the system can mask an entire XML datagram as a single unit or entity. In this embodiment, the system can be implemented in a simpler and straightforward fashion because no XML parsing, XML escaped HTML parsing, or <IMG> tag parsing is used. This embodiment can also more easily mask dynamic widgets. However, this embodiment can removes the ability to do easily perform functional testing on masked pages. The rendered detail page will likely appear as a giant string of random characters, if anything at all. Thus, this embodiment may inhibit quality assurance testing on the page when in a masked state, and may disrupt the development process.

In yet another embodiment, the system uses an unmasker that handles requests for content from a content repository and renders the unmasked markup language document. The unmasker can use a custom-grid layout or any other layout to serve content, unmask the content, and pass the unmasked content to the correct widget to render. This implementation may incorporate a new appconfig layout that wraps all the slots in an unmasker. This new layout can be gated through password authentication or other access control mechanism such as Kerberos, Odin with a shared secret, and so forth. This embodiment allows for full functional and stylistic testing during the masked state. If the document is already masked and a user wants to make a change to the content, the system unmasks the document, makes the requested changes, remasks the document, and saves the masked document. An automated editing tool can streamline this process.

In this embodiment, the system can launch the unmasked document, such as on a production web server, by disabling authentication and preferably disabling the masking when the document launches so that production customers are not impacted. For example, the system can use an authentication check look up a "shutoff" key, which could be an RSA private key that decrypts a hardcoded cipher text. If the shutoff key is found, then the system can bypass authentication and unmask all the content.

This embodiment can rely on an authentication proxy running Kerberos to validate a user. Once the user is validated, the system can restrict access to the private unmasking key. The key gets returned to the unmasking widget which can unmask the raw cipher text. This approach can depend on some basic XML parsing to translate XML into unmasked HTML. The XML parsing may differ based on whether the campaign content is a dynamic campaign or a static campaign. This embodiment keeps content masked, and has a way to unmask the content on the fly and limit that ability on a per-user basis, and minimizes the amount of XML parsing.

Another embodiment uses Kerberos authentication and unmasks documents in a service. In one example implementation, a Java command-line utility creates masked campaigns and can read XML from a file. The Java command-line utility reads a public key to mask content, and can upload masked content. In another implementation, a web server implements the masking, unmasking, and authentication subsystems. The web server can allow users to unmask the current content and modify small parts of it without rewriting the entire document. The web server can provide more flexible editing tools and integrate a masked document with other campaign management tools. Access control mechanisms can be implemented around the tool to further secure the keys.

For example, a browser visits product page, such as an e-commerce product detail page. Internal requests can include a Kerberos identity. The web server can point to a new "item-slot" instead of an existing slot. This new slot type can be written in PageFramework, for example. The "item-slot" behaves just like the existing slot, except the "item-slot" calls a different server, such as a managed proxy. The managed proxy can include a service that validates user credentials, fetches the masked campaign, fetches a private key, unmasks the campaign, and returns campaign contents to the "item-slot" handler in PageFramework. Then the web server can deliver or render the unmasked widget. When the masked campaign launches, the system can transition the unmasked content to a production server that is available to all users. To launch a masked campaign, the system can perform a batch unmask, such as via a command line tool, and then swap out the appconfig to go from "item-slot" back to the existing slot.

FIG. 2 illustrates a sample rendering of a web page 200 showing an example unmasked markup language document, such as a web page. The example web page 200 includes an image component 202, a text component 204, and a set of graphical widgets 206. The system can mask or otherwise modify these components. The web page 200 can include other components besides the ones illustrated in FIG. 2. Further, the web page 200 may include portions which are not marked as part of a component, or portions which are part of more than one component. A parser or other tool can determine component boundaries automatically, or can rely on a user indication of which components to consider.

Figure 3:
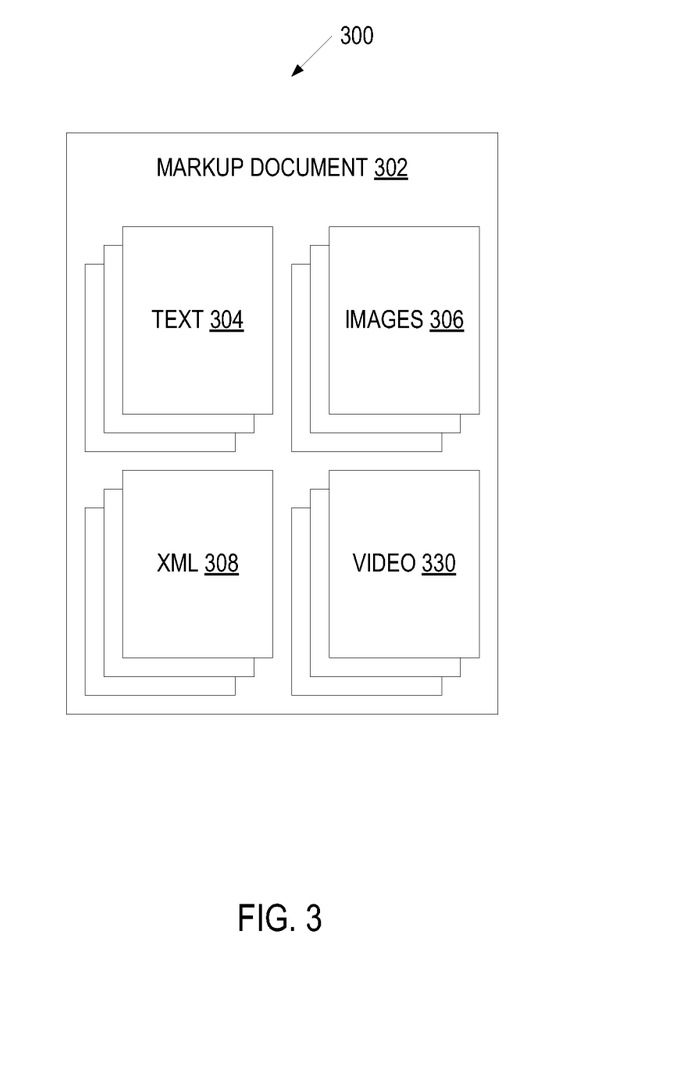
FIG. 3 illustrates a sample rendering of an example masked markup language document.

FIG. 3 illustrates components 300 of an example markup language document 302. At a high level, the system masks content in a markup language document 302, such as a web page. The same principles can be applied to different types of documents besides web pages, such as extensible markup language (XML) documents, scalable vector graphics (SVG) images, TeX or LaTeX documents, or standard generalized markup language (SGML) documents, for example. The example markup language document 302 can contain text components 304, image components 306, XML components 308 or other sub-components that themselves contain markup language, and video components 330. These document components are examples and the types of possible components in the markup language document 302 are not limited to these examples. However, the illustrative examples set forth below shall primarily focus on text components and image components. The system replaces secret or confidential text components with content that is not secret or confidential, such as gibberish, Lorem Ipsum, previous versions of the text component, encrypted text, obfuscated text, or other replacement text. In the case of images, the system can examine the dimensions of the images and replace them with fake images. In some embodiments, the system can also analyze the content of the images and select or generate fake images that preserve the color or design scheme of the original. In other embodiments, the system can use a same fake image resized to the appropriate dimensions for each replaced image. The system can also use the image to be replaced as a 'seed' to generate the replacement image.

The system can preserve the HTML and CSS styling to give a general feel that the content on the page is correct, even if some or all of the content has been substituted or masked with replacement content. Quality assurance and testing is at least partially possible because the styling and layout remains consistent. In order to preserve as much of the layout as possible, the system can, in one embodiment, preserve spacing and character widths so that the replacement text wraps in the same way as the original text, for example.

Figure 4:
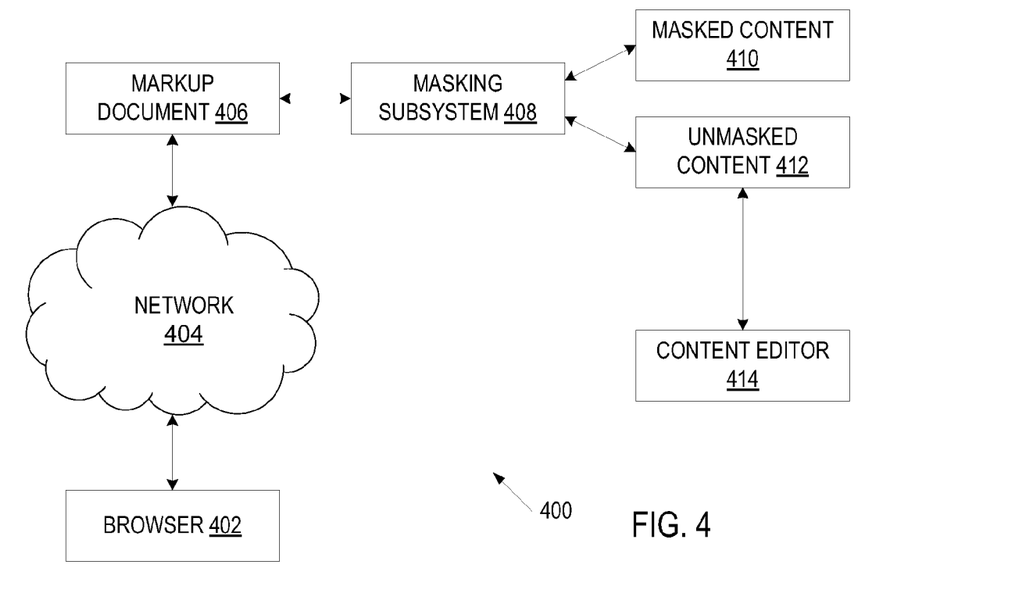
FIG. 4 illustrates a block diagram of an example static masking embodiment.

FIG. 4 illustrates a block diagram of an example static masking embodiment 400. In the static masking embodiment, a masking subsystem 408 modifies a markup language document 406 on a web server, not shown, to mask content. In this example, a browser 402 accesses a markup language document 406 via a network 404. The masking subsystem 408 can insert masked content 410 in the markup language document 406 in place of unmasked content 412 and store the unmasked content 412 external to the markup language document 406. Authorized users can then access the unmasked content 412 via a content editor 414 or other tool. The content editor 414 can provide access to the entire markup language document 406 with the unmasked content, or can provide direct access to specific portions of unmasked content independent of the markup language document 406. In some cases, the content editor 414 is incorporated in to a web server so that authorized users can simply directly access the same markup language document 406 as other users, but the web server provides different versions of the markup language document 406 to authorized users and to unauthorized users.

Figure 5:
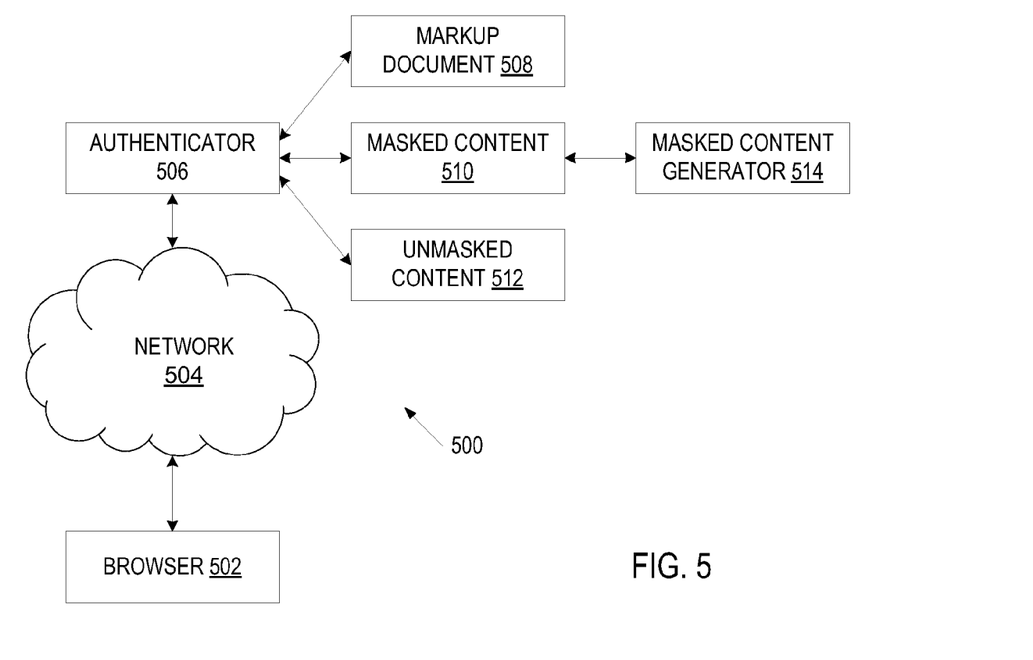
FIG. 5 illustrates a block diagram of an example dynamic masking embodiment.

FIG. 5 illustrates a block diagram of an example dynamic masking embodiment 500. In this example, a browser 502 requests access to a markup language document 508 via a network 504 and through an authenticator 506. The authenticator verifies the identity or credentials of the browser, the client software application, a user operating the browser, or other entity. Based on that verification and in response to the request, the authenticator 506 can serve the markup language document 508 with the masked content 510 or with the unmasked content 512. The authenticator 506 may be separate from a masked content generator 514 which can populate the masked content 510. In some embodiments, the masked content 510 is generated dynamically so that two requests for the markup language document 508 result in different masked content 510. In another embodiment, the masked content generator 514 generates user-specific masked content 510, so that each user sees unique masked content that doesn't change for that user, but other users see different masked content. Users can request the markup language document 508 for viewing or for editing.

Figure 6:
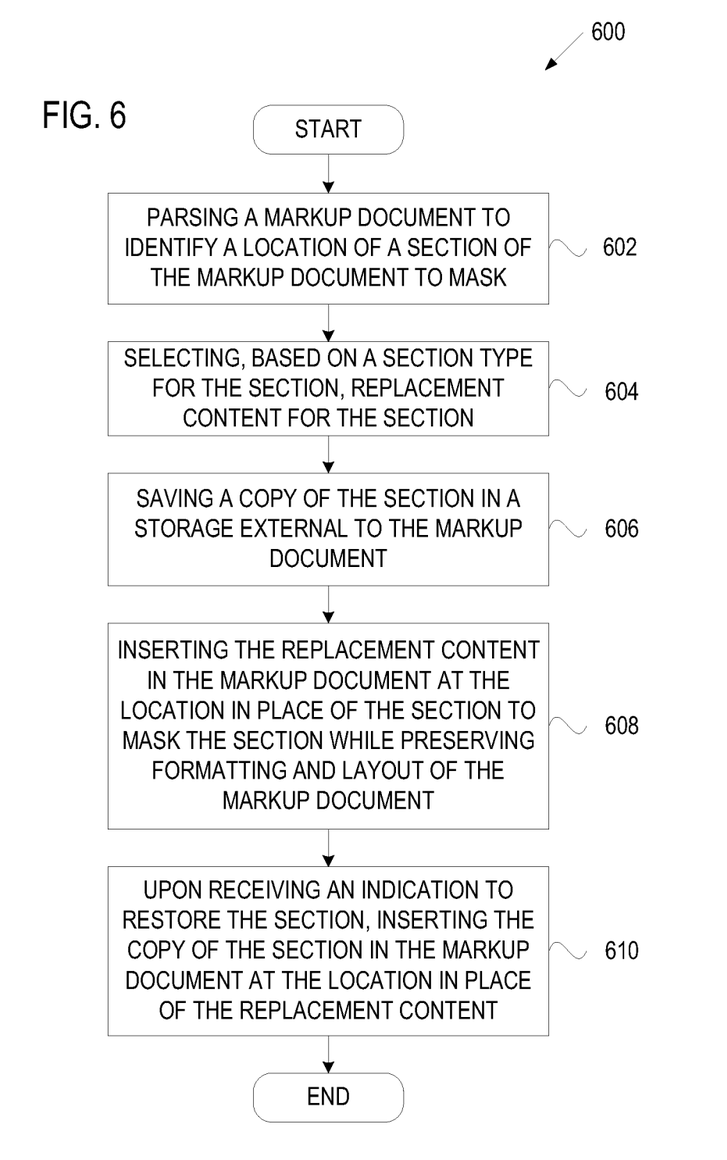
FIG. 6 illustrates a flow diagram of one embodiment of a method for masking and unmasking a markup language document.

FIG. 6 illustrates a flow diagram of one embodiment of a method for masking and unmasking a markup language document. The method 600 is performed by processing logic that may comprise hardware (circuitry, dedicated logic, etc.), software (such as is run on a general purpose computer system or a dedicated machine), or a combination of both. In one embodiment, the method is performed by a masking subsystem 408 of FIG. 4.

An example system implementing the method can parse a markup language document to identify a location of a section of the markup language document to mask (602). Alternatively, a human user can tag or mark certain sections, indicating to the system that those sections should be masked. For example, a user can insert HTML or XML tags that signal to the system to mask an indicated region, and can include arguments in the tags that provide instructions or details of how to mask the region, what replacement content or types of replacement content can be used, and so forth. While parsing a markup language document is one way to identify the location of the section to mask, the system can identify the location using other ways.

The system can select, based on a content type for content within the section, replacement content for the section (604). The markup language document can contain content such as text, alternate text, metadata, images, video, audio, widgets, interactive elements, active content, configuration data, and so forth. Active content can include content authored in Flash, Silverlight, or other such technology platforms, in which the content is not a static image, but can execute code, interact with users, fetch data via a network, or take other dynamic actions. The system can select or generate replacement content to mask various content types differently. For example, if the content is an image, the system can identify dimensions for the image, and generate or fetch a replacement image matching the dimensions as the replacement content. If the content is text, the system can generate replacement text that maintains the same character spacing and same character widths as the original text. If the content is an interactive element, the system can generate a replacement element that interacts using the same mechanisms, but does not include the sensitive portions to be masked, for example. The replacement content can include encrypted content, meaningless content, out-dated content, or decoy content. Any type of replacement content can be used that either does not impact or does not significantly impact the style and layout of the markup language document.

The system can save a copy of the section in a storage external to the markup language document (606). For example, the system can save a copy of the section on a same server that hosts the markup language document, but in a separate file or different virtual machine instance that is external to the markup language document, or on a different server completely. An unmasking subsystem can index original copies in a database for retrieval and presentation to authorized users or to administrators, for example. The system can store all extracted sections from one document in a single location or in multiple locations. In one aspect, a duplicate of the entire markup language document containing all sections to be masked is saved in a separate location. The system can insert the replacement content in the markup language document at the location in place of the section to mask the section, such as for users outside of a managed group, while preserving formatting and layout of the markup language document (608). At this point, the markup language document is a masked markup language document, as the section has been masked or substituted by the replacement content. The system can create a backup of the unmasked section external to the markup language document, and make the backup of the unmasked section available to authorized users for editing.

Upon receiving an indication to restore the section, such as a user that is part of a managed group accessing the markup language document, the system can insert the copy of the section in the markup language document at the location in place of the replacement content (610). The system can insert the copy of the section, thereby restoring the original document, as a way to reverse the masking. Alternatively, the system can serve the masked markup language document to unauthorized users, and selectively unmask the content on-the-fly for authorized users by reconstructing a temporary document containing the unmasked portions and providing the temporary document to the authorized users.

Users can be authorized on a per-document basis or on a per-content basis. For example, a user authorized for the entire document can view the original content corresponding to all masked sections. However in one variation, different users may be authorized to view the original content of different masked portions. For example, consider a masked document having a masked section A and a masked section B, and users W, X, Y, and Z accessing the masked document. When user W, who is unauthorized, accesses the masked document, the system provides the masked document without any of the original content. When user X, who is authorized only for masked section A, accesses the masked document, the server restores the unmasked content for section A in what is served to user X. When user Y, who is authorized only for masked section B, accesses the masked document, the server restores the unmasked content for section B in what is served to user Y. When user Z, who is authorized for all masked sections, accesses the masked document, the server restores the unmasked content for sections A and B in what is served to user Z. Each user can see a different mixture of masked and unmasked content based on their respective authorizations for that document and for the sections of the document.

In order to facilitate various user authorization schemes, the system can associate the replacement content with a corresponding user authorization level, and insert the copy of the section for users having the corresponding user authorization level. Then, authorized users can provide input to edit the copy of the section independent of the markup language document.

In one variation, the system can associate the replacement content with an expiration date, wherein the indication to restore the section is based on expiry of the expiration date. For example, a web developer may work on a set of product pages for a product that is scheduled to launch on a specific date, using masked content to protect the secrecy of the set of product pages. The web developer may complete the new product pages and complete testing of the new product pages before the product launches. Thus, the web developer can assign an expiration date with the replacement content so on the launch date the system can automatically discard the replacement content and roll out the updated product pages in its place on the desired date and time.

Figure 7:
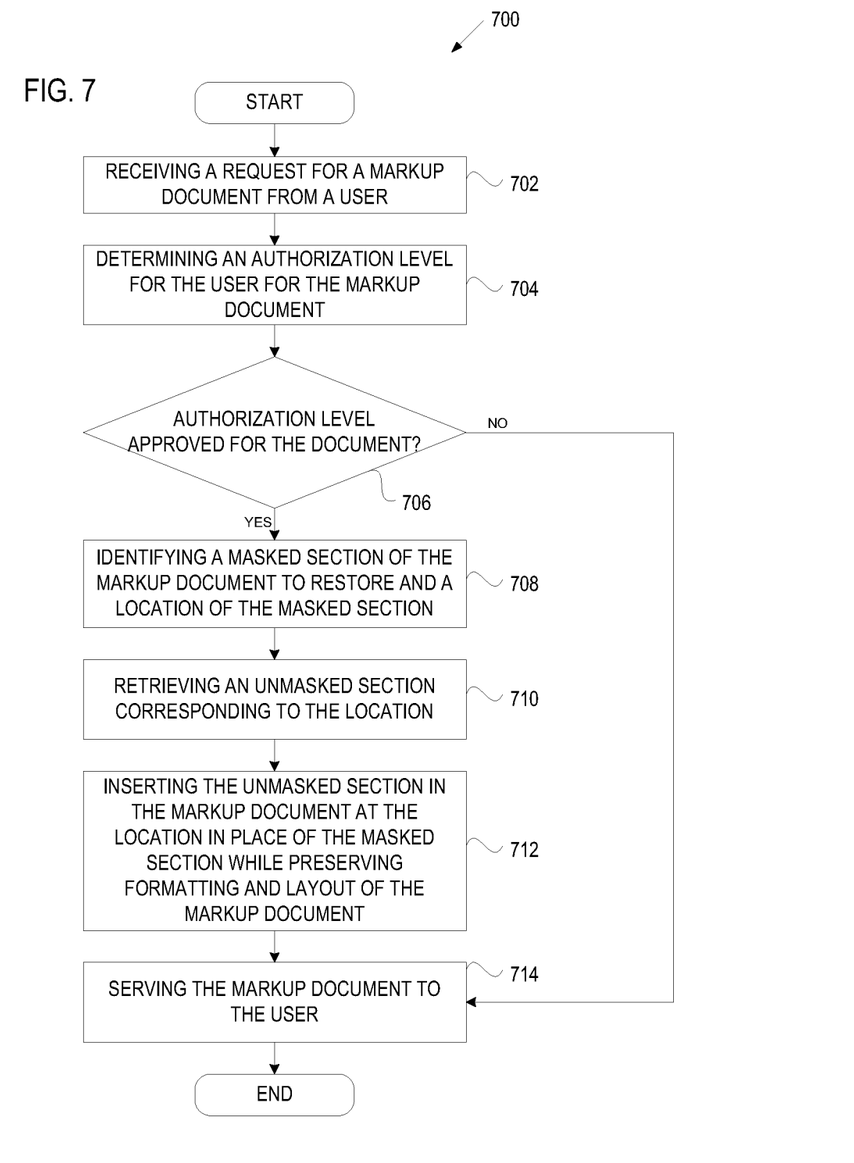
FIG. 7 illustrates a flow diagram of one embodiment of a method for dynamically serving a markup language document in a masked or an unmasked form.

FIG. 7 illustrates a flow diagram of one embodiment of a method for dynamically serving a markup language document in a masked or an unmasked form. The method 700 is performed by processing logic that may comprise hardware (circuitry, dedicated logic, etc.), software (such as is run on a general purpose computer system or a dedicated machine), or a combination of both. In one embodiment, the method is performed by a masking subsystem 408 of FIG. 4. An example system implementing the method can receive a request for a markup language document from a user (702), and determine an authorization level for the user for the markup language document (704). The authorization level can be based on a Kerberos identity, and can optionally be determined via a proxy that interprets decoded XML content in the markup language document. The proxy can validate user credentials, fetch the masked content, fetch a private key, unmask the masked content using the private key to yield the unmasked content, and return the unmasked content to the user.

The system can perform a check whether the authorization level is approved for the document (706). In one embodiment, the system registers the replacement content and the markup language document with an unmasking service that services requests for the markup language document and substitutes the replacement content with the content for authorized users.

If the authorization level is approved, the system can identify a masked section of the markup language document to restore and a location of the masked section (708), and retrieve an unmasked section corresponding to the location (710), such as from a database, a copy of the original markup language document, etc. The system can insert the unmasked section in the markup language document at the location in place of the masked section while preserving formatting and layout of the markup language document (712), and can serve the markup language document to the user with the unmasked section (714).

On the other hand, when the authorization level is not approved for the document, the system can serve the markup language document to the user with the masked section (714). In some embodiments, a user submits credentials with inadequate permissions or authority, so the system serves the markup language document with the masked section. In other embodiments, a user simply requests the markup language document without providing any credentials or authorization level. Thus, the system can assign the user a default authorization level, which may be low or zero, so the system serves the markup language document with the masked section. As set forth above, the system can perform these steps on a per-section level so that a user's authorization level may be sufficient to view, manage, or manipulate one unmasked section of a markup language document, but insufficient for another unmasked section of the same markup language document.

Figure 8:
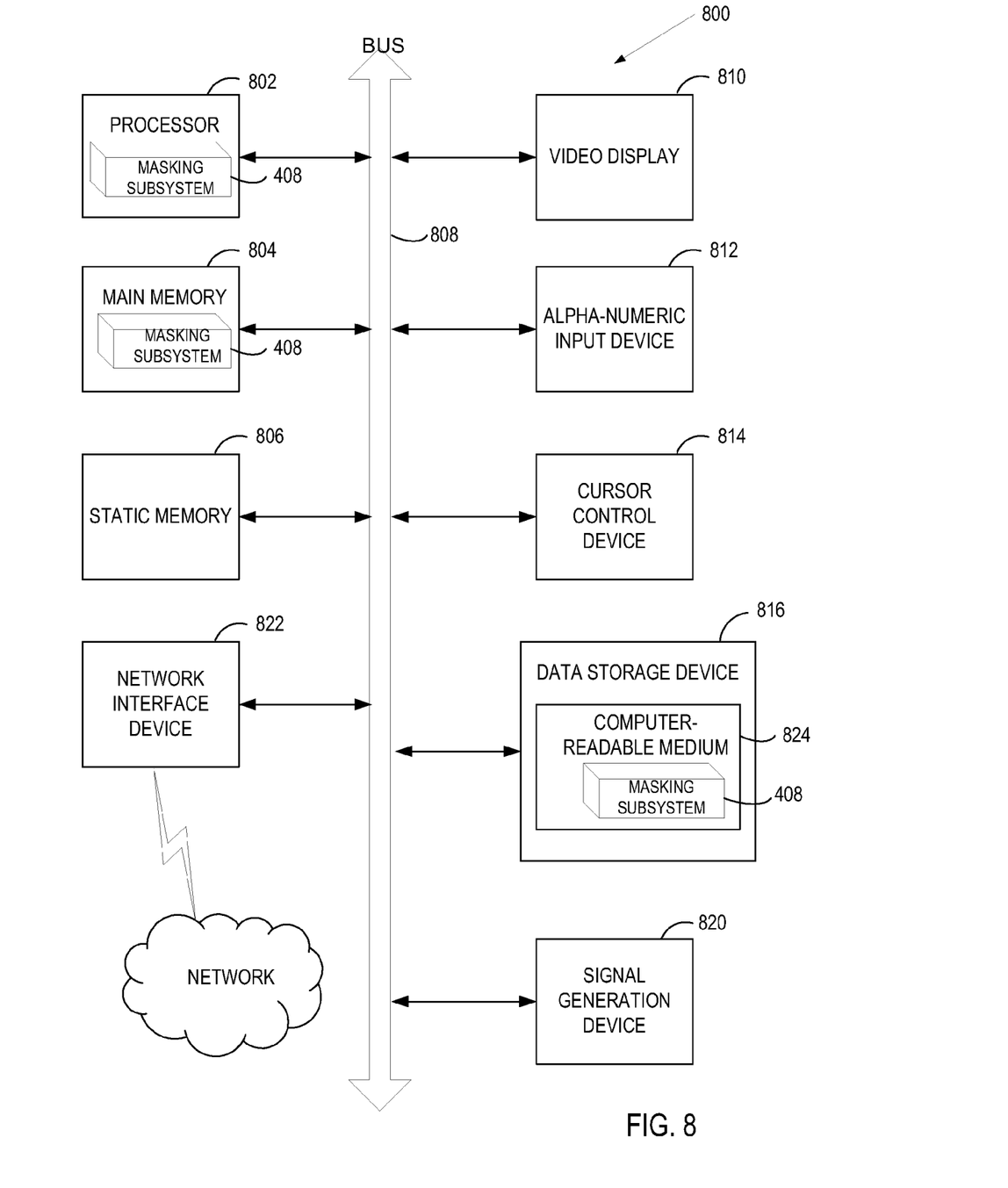
FIG. 8 illustrates a block diagram of one embodiment of a user device.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic (e.g., instructions 826) for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), other user input device such as a touch screen or a microphone, and a signal generation device 820 (e.g., a speaker).

The secondary memory 818 may include a machine-readable storage medium (or more specifically a computer-readable storage medium) 824 on which is stored one or more sets of instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

The computer-readable storage medium 824 may also be used to store instructions which may correspond to the masking subsystem 408 of FIG. 4, and/or a software library containing methods that call a masking subsystem 408. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "parsing", "selecting", "saving", "inserting", "determining", "identifying", "serving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   parsing, by a processing device, a markup language document to identify a location of a section of the markup language document to mask;
   identifying a layout of the section;
   identifying, by the processing device, characteristics of original content within the section, wherein the characteristics comprise at least one of a color scheme of an image, a design scheme of the image, a character spacing of a word of text, or a mechanism of an interactive element;
   generating, by the processing device, replacement content for the section based on the characteristics of the original content within the section, wherein the replacement content for the section has the layout of the section;
   associating the replacement content with an expiration date;
   saving, by the processing device, a copy of the section;
   inserting, by the processing device, the replacement content in the markup language document at the location in place of the section to mask the section for unauthorized users;
   receiving an indication that an authorized user is requesting access to the markup language document; and
   restoring, by the processing device, the section by inserting an instance of the copy of the section in the markup language document at the location in place of the replacement content.

2. The method of claim 1, further comprising: modifying, based on user input, the copy of the section.

3. The method of claim 1, wherein the markup language document comprises one of an extensible markup language (XML) document or a hypertext markup language (HTML) document.

4. The method of claim 1, wherein the original content further comprises the image, the method further comprising: analyzing the image; and generating a replacement image that preserves at least one of the color scheme or the design scheme of the image.

5. The method of claim 1, further comprising: associating the section with a corresponding user authorization level; and restoring the section for users having the corresponding user authorization level.

6. The method of claim 1, further comprising: restoring the section on or after the expiration date.

7. A system comprising:
   a memory; and
   a processing device operatively coupled to the memory, the processing device to:
   identify a location of original content in a markup language document to mask;
   identify a layout of the original content;
   identify characteristics of the original content, wherein the characteristics comprise at least one of a color scheme of an image, a design scheme of the image, a character spacing of a word of text, or a mechanism of an interactive element;
   generate replacement content for the original content based on the characteristics of the original content, wherein the replacement content has the layout of the original content;
   associate the replacement content with an expiration date; and
   insert the replacement content in the markup language document at the location in place of the original content to mask the original content.

8. The system of claim 7, wherein the original content comprises at least one of text, image content, video content, audio content, or active content.

9. The system of claim 7, wherein the original content further comprises the image and the processing device is further to: analyze at least one of the color scheme or the design scheme of the image; and select a replacement image that preserves at least one of the color scheme or the design scheme of the image.

10. The system of claim 7, wherein the original content comprises text comprising the word of text and the processing device is further to: analyze the text on a word-by-word basis to determine a word length of the word of text; and generate replacement text as the replacement content, wherein the replacement text maintains at least one of the character spacing or same character widths as the text, and wherein the replacement text comprises a replacement word that has the word length of the word of text.

11. The system of claim 7, wherein the processing device is further to: register the replacement content and the markup language document with an unmasking service that handles requests for the markup language document and substitutes the replacement content with the original content for authorized users.

12. The system of claim 7, wherein the processing device is further to: associate the original content with a first authorization level for accessing the original content, wherein the first authorization level is different from a second authorization level associated with other content in the markup language document.

13. The system of claim 7, wherein the original content further comprises the interactive element and the processing device is further to: select a replacement element that interacts using the mechanism of the interactive element.

14. The system of claim 7, wherein the processing device is further to: create a backup of the original content external to the markup language document; and make the backup of the original content available to authorized users for editing.

15. A non-transitory computer-readable storage medium having stored therein instructions which, when executed by a processing device, cause the processing device to perform operations comprising:
   receiving, by the processing device, a request for a markup language document from a user;
   determining, by the processing device, an authorization level for the user for at least a portion of the markup language document;
   determining that the authorization level has been approved for the at least the portion of the markup language document;
   identifying a masked section of the markup language document and a location of the masked section, wherein the masked section has a layout of an unmasked section, and wherein characteristics of replacement content in the masked section comprises at least one of a color scheme of an image, a design scheme of the image, a character spacing of a word of text, or a mechanism of an interactive element, and wherein the replacement content is associated with an expiration date;
   retrieving the unmasked section corresponding to the location;
   inserting the unmasked section in the markup language document at the location in place of the masked section; and
   providing the markup language document to the user with the unmasked section.

16. The non-transitory computer-readable storage medium of claim 15, the operations further comprising: creating a backup of the unmasked section external to the markup language document; and making the backup of the unmasked section available to authorized users for editing.

17. The non-transitory computer-readable storage medium of claim 15, wherein the authorization level is based on a rule-based authentication protocol.

18. The non-transitory computer-readable storage medium of claim 15, wherein the authorization level for the user is determined via a proxy.

19. The non-transitory computer-readable storage medium of claim 18, wherein the proxy interprets decoded extensible markup language (XML) content in the markup language document.

20. The non-transitory computer-readable storage medium of claim 18, wherein the authorization level is associated with a first portion of the markup language document, and wherein a second authorization level is associated with a second portion of the markup language document.

* * * * *